(12) United States Patent
Sasanuma et al.

(10) Patent No.: US 10,794,483 B2
(45) Date of Patent: Oct. 6, 2020

(54) SPOOL VALVE

(71) Applicant: NTN CORPORATION, Osaka (JP)

(72) Inventors: Kyohei Sasanuma, Shizuoka (JP);
Takayuki Norimatsu, Shizuoka (JP);
Naoshi Hattori, Shizuoka (JP);
Takahide Saito, Shizuoka (JP); Hiroshi Kawamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 349 days.

(21) Appl. No.: 15/500,303

(22) PCT Filed: Jul. 17, 2015

(86) PCT No.: PCT/JP2015/070546

§ 371 (c)(1),
(2) Date: Jan. 30, 2017

(87) PCT Pub. No.: WO2016/017458

PCT Pub. Date: Feb. 4, 2016

(65) Prior Publication Data

US 2017/0211699 A1    Jul. 27, 2017

(30) Foreign Application Priority Data

Jul. 31, 2014   (JP) .................................. 2014-156595

(51) Int. Cl.
  *F16K 11/07*   (2006.01)
  *F16K 31/50*   (2006.01)
  (Continued)

(52) U.S. Cl.
  CPC ........... *F16H 63/062* (2013.01); *B60W 10/04* (2013.01); *B60W 10/101* (2013.01);
  (Continued)

(58) Field of Classification Search
  CPC .... F16K 11/07; F16K 11/065; F16K 11/0716; F16K 31/047; F15B 13/0402; Y10T 137/86622; Y10T 137/86702
  (Continued)

(56) References Cited

U.S. PATENT DOCUMENTS 2,738,684 A * 3/1956 Shafer ................... F16K 31/508
                                                   74/89.39
2,966,891 A * 1/1961 Williams .................. F15B 9/08
                                                   137/625.66
(Continued)

FOREIGN PATENT DOCUMENTS

CN         102278516         12/2011
CN         203477484         3/2014
(Continued)

OTHER PUBLICATIONS

International Preliminary Report on Patentability dated Jan. 31, 2017 in corresponding International (PCT) Application No. PCT/JP2015/070546.
(Continued)

*Primary Examiner* — Kelsey E Cary
(74) *Attorney, Agent, or Firm* — Wenderoth, Lind & Ponack, L.L.P.

(57) ABSTRACT

A spool valve includes a spool in a spool insertion hole defined in a valve body. The spool is configured to be moved by an electric motor via a ball-screw to a first position where an input port is in communication with an output port, while the output port is not in communication with a drain port, and to a second position where the input port is not in communication with the output port, while the output port is in communication with the drain port.

6 Claims, 11 Drawing Sheets

(51) Int. Cl.
*F16H 25/22* (2006.01)
*F16H 63/06* (2006.01)
*F16K 31/53* (2006.01)
*F16K 31/04* (2006.01)
*F16H 61/02* (2006.01)
*B60W 10/04* (2006.01)
*B60W 10/101* (2012.01)
*F15B 13/04* (2006.01)
*F16K 11/065* (2006.01)
*F16H 63/30* (2006.01)
*F16H 25/20* (2006.01)
*F16H 61/66* (2006.01)

(52) U.S. Cl.
CPC ..... *F15B 13/0402* (2013.01); *F16H 61/0251* (2013.01); *F16K 11/065* (2013.01); *F16K 11/07* (2013.01); *F16K 31/04* (2013.01); *F16K 31/50* (2013.01); *F16K 31/53* (2013.01); *F16H 25/2204* (2013.01); *F16H 61/66* (2013.01); *F16H 2025/204* (2013.01); *F16H 2025/2087* (2013.01); *F16H 2061/0253* (2013.01); *F16H 2063/3063* (2013.01)

(58) Field of Classification Search
USPC ........ 137/625.65, 625.68; 251/266, 267, 272
See application file for complete search history.

(56) References Cited

U.S. PATENT DOCUMENTS

| | | | |
|---|---|---|---|
| 4,732,174 A | 3/1988 | Ueno | |
| 4,951,549 A | 8/1990 | Olsen et al. | |
| 5,005,442 A * | 4/1991 | Sakakibara | B60W 10/06 477/40 |
| 5,360,197 A * | 11/1994 | Reiter | F02M 51/0682 239/585.4 |
| 2005/0000580 A1 | 1/2005 | Tranovich et al. | |
| 2011/0023513 A1* | 2/2011 | Hamel | F16K 31/047 62/211 |
| 2011/0114860 A1* | 5/2011 | Schade | F16K 31/047 251/69 |
| 2011/0308619 A1* | 12/2011 | Martino | E21B 34/02 137/1 |
| 2015/0061363 A1 | 3/2015 | Murayama et al. | |

FOREIGN PATENT DOCUMENTS

| | | |
|---|---|---|
| DE | 2 141 519 | 2/1973 |
| JP | 61-75563 | 5/1986 |
| JP | 8-193668 | 7/1996 |
| JP | 2000-28023 | 1/2000 |
| JP | 2000-220760 | 8/2000 |
| JP | 2009-58013 | 3/2009 |
| WO | 2013/147252 | 10/2013 |

OTHER PUBLICATIONS

International Search Report dated Oct. 6, 2015 in corresponding International (PCT) Application No. PCT/JP2015/070546.

Extended European Search Report dated Jun. 20, 2017 in corresponding European Application No. 15826598.3.

* cited by examiner

SPOOL VALVE

TECHNICAL FIELD

This invention relates to a spool valve used when hydraulically controlling a cylinder for changing the speed ratio of a V-belt type continuously variable transmission, or when hydraulically controlling a clutch mounted in an automatic transmission.

BACKGROUND ART

JP Patent Publication 2009-58013 discloses a conventional spool valve used when hydraulically controlling a clutch mounted in an automatic transmission and configured to change the speed ratio of the transmission. This spool valve includes a sleeve formed with an input port, an output port, a drain port, and a feedback port; and a spool slidably inserted in the sleeve, and configured to be moved, by a driving member, to a first position where the spool allows communication between the input port and the output port, while prohibiting communication between the output port and the drain port, and to a second position where the spool prohibits communication between the input port and the output port, while allowing communication between the output port and the drain port, thereby selectively turning on and off the speed ratio-changing clutch mounted in the automatic transmission.

This spool valve can be used not only to change the speed ratio of an automatic transmission of the above-mentioned type, but can also be used to change the speed ratio of a V-belt type continuously variable transmission.

OBJECT OF THE INVENTION

The above-described conventional spool valve uses a solenoid as the driving member for moving the spool. Since the plunger of the solenoid is moved only a short distance, i.e., only several millimeters, the degrees of opening of the respective ports are correspondingly small when the respective two ports are brought into communication with each other. As a result, the oil supply passage connecting the discharge port of the hydraulic pump and the input port, and the oil supply passage connecting the output port and the clutch, i.e., the object to be controlled, are correspondingly narrow. Since oil cannot be supplied at a high flow rate through such narrow oil supply passages, the clutch as the object to be hydraulically controlled cannot be controlled with high responsiveness.

JP 2000-28023 discloses a hydraulic control valve for use in an injection molder which includes a ball-screw mechanism configured to convert the rotary motion of an electric motor as a driving source to a linear motion of a spool. If the electric motor and the ball-screw mechanism disclosed in JP 2000-28023 are used in the conventional spool valve disclosed in JP Patent Publication 2009-58013, it will become possible to move the spool disclosed in JP Patent Publication 2009-58013 by a long distance, and thus to increase the degrees of opening of the input port and the other ports, and the sectional areas of the oil supply passages connected to the respective ports. As a result, the responsiveness of the clutch as the object to be controlled will improve.

However, if attempts are made to use a spool valve configured such that a spool is axially moved by an electric motor and a ball-screw mechanism in hydraulically controlling a speed ratio-changing cylinder for moving the slide pulley member of the driving pulley of a V-belt type continuously variable transmission, if the electric motor should fail while the spool is being shifted toward a high-speed side by the electric motor, hydraulic oil will be continuously fed into the speed ratio-changing cylinder, thereby switching the V-belt type continuously variable transmission to a high-rotational-speed mode. As a result, the vehicle will accelerate suddenly, thus exerting large impacts on the driver, which will cause the driver to feel great fear.

SUMMARY OF THE INVENTION

An object of the present invention is to provide a spool valve which improves the responsiveness of the object to be hydraulically controlled, such as a V-belt type continuously variable transmission, and which improves the overall safety.

Means to Achieve the Object

In order to achieve this object, the present invention provides a spool valve comprising:

a valve body having a spool insertion hole inside of the valve body, and formed with an input port, an output port, and a drain port which communicate with the spool insertion hole;

a spool slidably inserted in the spool insertion hole, and configured to selectively allow and prohibit communication between the input port, the output port, and the drain port by moving in an axial direction;

an electric motor configured to drive the spool in the axial direction;

a ball-screw configured to convert the rotary motion of the electric motor to a linear motion of the spool in the axial direction such that when the electric motor is rotated in one direction, the spool is moved to a first position where the spool allows communication between the input port and the output port, while shutting off communication between the output port and the drain port, and when the electric motor is rotated in the other direction, the spool is moved to a second position where the spool shuts off communication between the input port and the output port, while allowing communication between the output port and the drain port; and an elastic member biasing the spool toward the second position.

To use this spool valve to hydraulically control a speed ratio-changing cylinder of a V-belt type continuously variable transmission, oil passages are connected, for fluid communication, between the input port and the discharge port of the oil pump and between the output port and the inlet and discharge ports of the cylinder.

In this state, when the electric motor is driven, the ball-screw is actuated to move the spool in the axial direction. When the spool is moved to the first position, the input port communicates with the output port, so that oil discharged from the oil pump is fed into the cylinder. This moves the slide pulley member of the driving pulley of the transmission toward the fixed pulley member of the driving pulley; that is, the driving pulley is shifted toward the high-speed side.

When the speed ratio of the V-belt type continuously variable transmission is changed to a predetermined value, the electric motor is turned in reverse to move the spool to a neutral position where the input port and the output port, as well as the output port and the drain port, are disconnected from each other.

If the electric motor should fail while the spool is being shifted toward the high-speed side, the spool is moved back, under the biasing force of the elastic member, to the second position, where the input port is disconnected from the output port, while the output port communicates with the drain port. As a result, oil in the cylinder is discharged through the output port to the drain port. This causes the slide pulley member of the driving pulley to be moved away from the fixed pulley member of the driving pulley, i.e., causes the driving pulley to be shifted toward the low-speed side.

As described above, if the electric motor should fail while the driving pulley is moving toward the high-speed side, since the driving pulley is shifted toward the low-speed side, the vehicle decelerates, so that the driver will feel less impacts, and is safer, than when the driving pulley is shifted toward the high-speed side.

Preferably, the ball-screw comprises a threaded shaft, and a nut, wherein one of the threaded shaft and the nut is a rotary member configured to be rotated by the electric motor, and the other of the threaded shaft and the nut is a linear motion member configured to be moved in the axial direction, and move the spool in the axial direction, when the electric motor is rotated.

In the spool valve according to the present invention, the elastic member may comprise a compression coil spring having a first bent piece at one end of the compression coil spring, and a second bent piece at the other end of the compression coil spring, wherein the first bent piece extends in the axial direction and is slidably inserted in an axial hole formed in the end surface of the spool, and the second bent piece is in engagement with the valve body such that the spool is rotationally fixed in position. With this arrangement, since it is not necessary to rotationally fix the other of the threaded shaft and the nut of the ball-screw, i.e., the linear motion member for moving the spool in the axial direction, it is possible to simplify the structure of the spool valve.

The linear motion member of the ball-screw may be directly rotationally fixed in position, or indirectly rotationally fixed in position by rotationally fixing the spool, as described above. To rotationally fix the spool, a guide pin may be used which extends from the distal end surface of the spool at an off-center position of the spool, and is slidably inserted in a pin hole formed in an end plate of the valve body, or a guide pin may be provided extending from the center of the distal end surface of the spool and having a non-circular cross-section, the guide pin being slidably inserted in a pin hole formed in the end plate of the valve body and having a non-circular cross-section.

The spool valve may further comprise a planetary gear reduction mechanism configured such that the rotation of the electric motor is transmitted to the rotary member of the ball-screw after being reduced by the planetary gear reduction mechanism. With this arrangement, it is possible to use a low-capacity electric motor, which in turn makes it possible to reduce the axial length of the spool valve.

In another arrangement, the electric motor is arranged in parallel with the ball-screw, and the spool valve further comprises a spur gear reduction mechanism configured such that the rotation of the electric motor is transmitted to the rotary member of the ball-screw after being reduced by the spur gear reduction mechanism. This arrangement makes it possible to further reduce the axial length of the spool valve.

By using the nut of the ball-screw as the spool, too, it is possible to reduce the axial length of the spool valve.

Advantages of the Invention

According to the present invention, since the spool is axially moved by actuating a ball-screw by driving an electric motor, the spool can be moved a longer distance than the spool of a conventional spool valve in which the spool is moved by a solenoid. This makes it possible to increase the degrees of opening of the various ports of the spool valve, including the input port, and thus to increase the sectional areas of the oil passages connected to the respective ports, which in turn improves the responsiveness of the object to be hydraulically controlled, such as a V-belt type continuously variable transmission.

Since the spool valve according to the present invention is configured such that if the electric motor fails while the spool is being moved by the electric motor toward the high-speed position where the input port communicates with the output port, the spool is automatically moved, under the biasing force of the elastic member, to the low-speed position where the output port communicates with the drain port, the spool valve according to the present invention is safer than a conventional spool valve of which the spool is retained in the high-speed position.

BEST MODE FOR EMBODYING THE INVENTION

Figure 1:
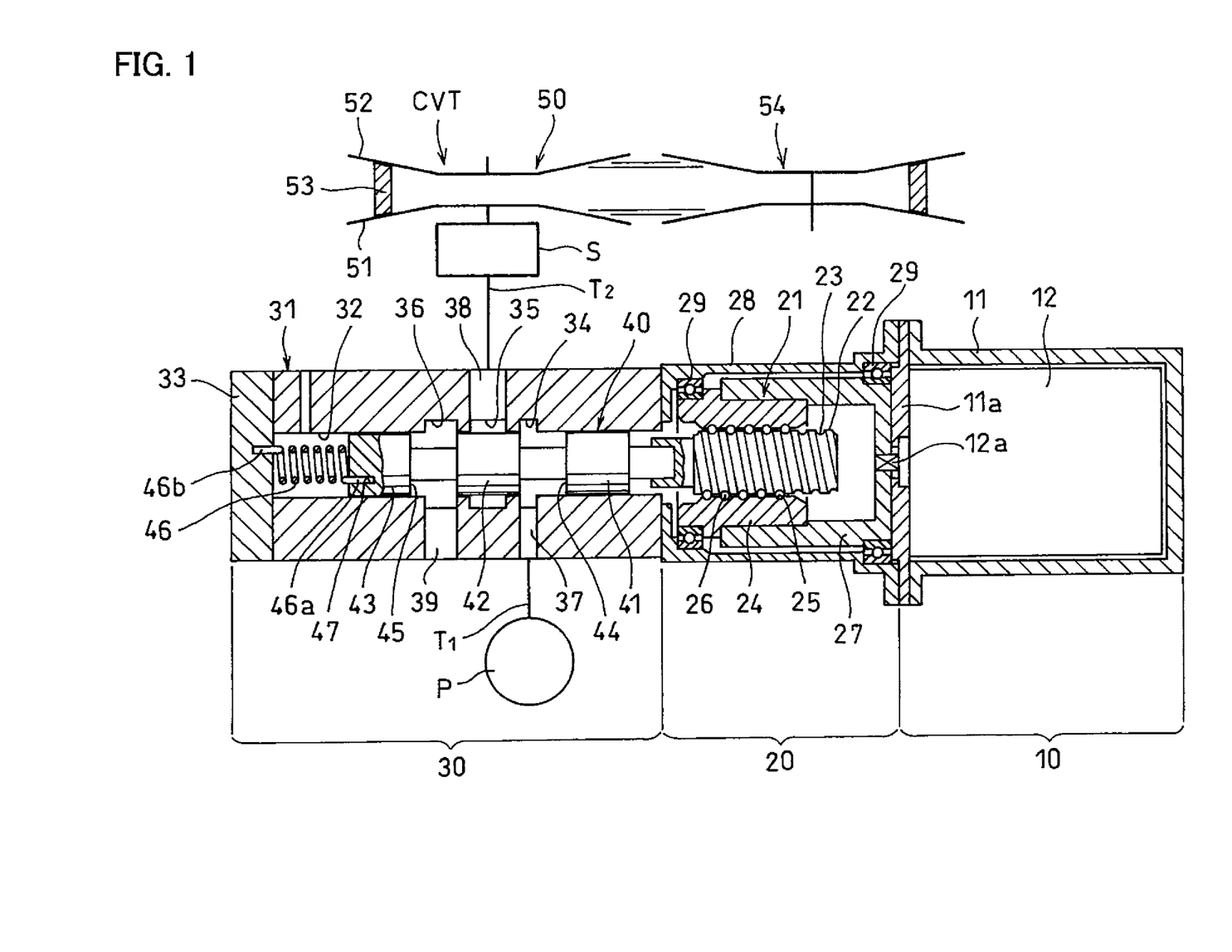
FIG. 1 is a schematic longitudinal sectional view of a spool valve according to the present invention, showing how it is used.

Embodiments of the present invention are now described with reference to the drawings. FIG. 1 shows a spool valve of one embodiment which comprises an electric motor section 10, a motion converter mechanism section 20 configured to covert a rotary motion to a linear motion, and a hydraulic control section 30.

The electric motor section 10 comprises a motor case 11, and an electric motor 12 mounted in the motor case 11. The electric motor 12 has a rotary shaft 12a extending through an end plate 11a of the motor case 11, and protruding into the below-described nut case 28 connected to an end of the motor case 11.

The motion converter mechanism section 20 includes a ball-screw 21, and a nut case 28 covering the ball-screw 21. The ball-screw 21 includes a threaded shaft 22 having a thread groove 23 in the outer periphery thereof, a nut 24 fitted around the threaded shaft 22, and balls 26 disposed between a thread groove 25 formed in the inner periphery of the nut 24 and the thread groove 23 of the threaded shaft 22. The nut 24 is fitted in an open end portion of a tubular nut holder 27 having a closed end so as to rotate together with the nut holder 27. The nut holder 27 is connected to the rotary shaft 12a of the electric motor 12 so as to be rotationally driven by the electric motor 12.

The nut 24 and the nut holder 27 are entirely covered by the nut case 28, which is connected to the motor case 11, and are rotatably supported by a respective pair of rolling bearings 29 mounted in the nut case 28 at its respective ends.

The hydraulic control section 30 includes a valve body 31 connected to the end of the nut case 28. The valve body 31 is formed with a spool insertion hole 32 extending through the valve body 31 from one to the other end thereof. The spool insertion hole 32 has a distal end closed by an end plate 33 connected to the valve body 31.

The spool insertion hole 32 has a radially inner surface formed with a first circumferential groove 34, a second circumferential groove 35, and a third circumferential groove 36 which are arranged in this order from the end of the spool insertion hole 32 close to the ball-screw 21. The valve body 31 is formed, in its outer periphery, with an input port 37 communicating with the first circumferential groove 34, an output port 38 communicating with the second circumferential groove 35, and a drain port 39 communicating with the third circumferential groove 36.

A shaft-shaped spool 40 is inserted in the spool insertion hole 32. The spool 40 is connected at one end portion thereof to the threaded shaft 22 of the ball-screw 21 so as to be not rotatable relative to the threaded shaft 22, and axially movable together with the threaded shaft 22.

The spool 40 has a first land 41, a second land 42, and a third land 43 which are arranged in this order from the end of the spool 40 close to the threaded shaft 22 so as to be slidable along the radially inner surface of the spool insertion hole 32. The spool 40 is further formed with a groove-shaped first oil flow passage 44 between the first land 41 and the second land 42, which are adjacent to each other, and a groove-shaped second oil flow passage 45 between the second land 42 and the third land 43.

Figure 2A:
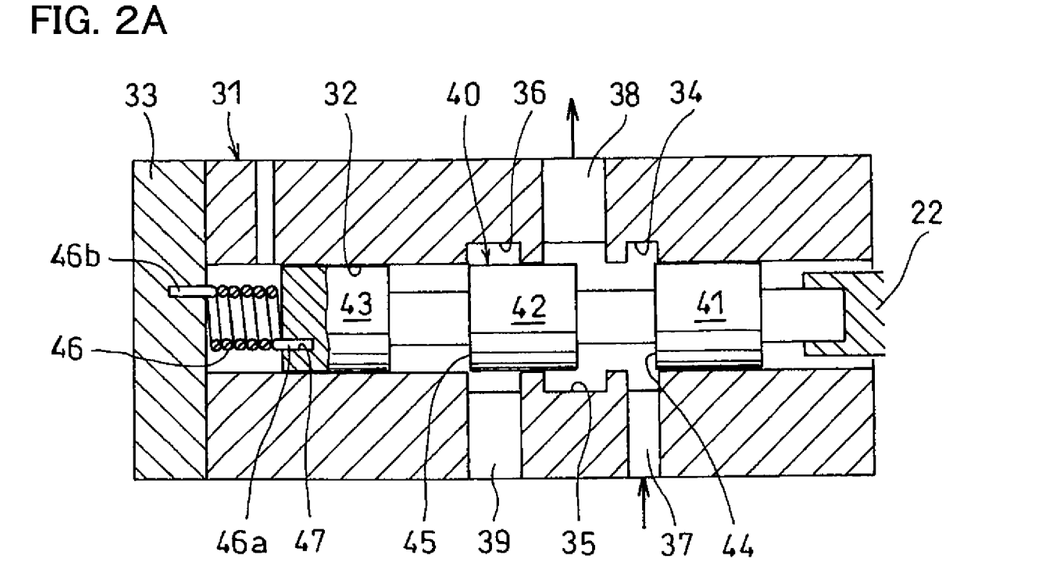
FIG. 2A is a sectional view of the spool valve shown in FIG. 1, when it is in a high-speed position.
Figure 2B:
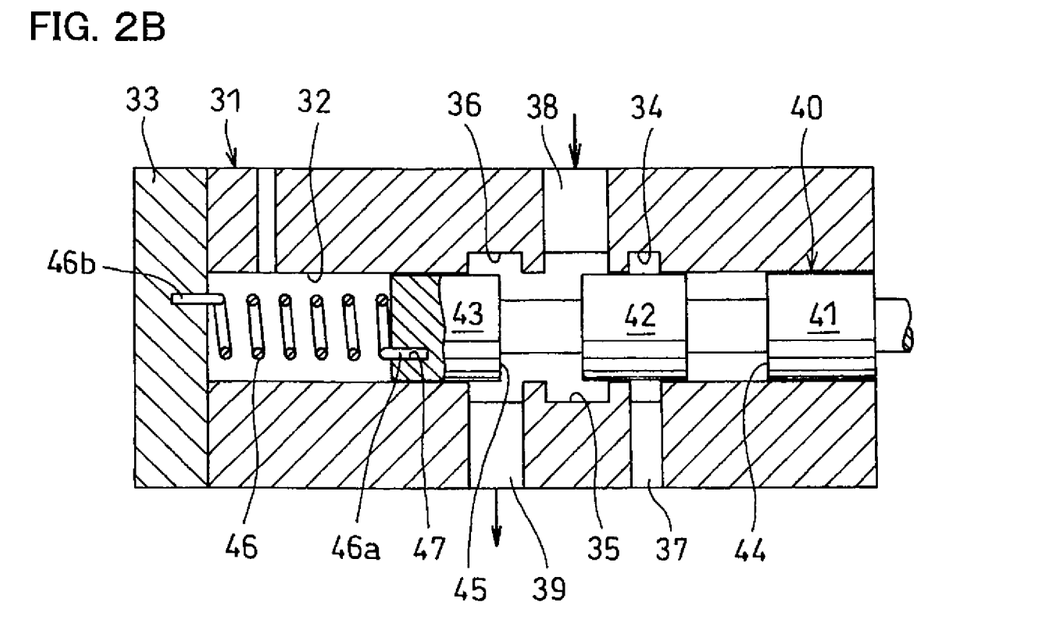
FIG. 2B is a sectional view of the spool valve shown in FIG. 1, when it is in a low-speed position.

The spool 40 is movable between a neutral position, where the second land 42 shuts off communication between the input port 37 and the output port 38 and between the output port 38 and the drain port 39, and a first position (high-speed position), shown in FIG. 2A, where the input port 37 and the output port 38 communicate with each other via the first oil flow passage 44, while the second land 42 shuts off communication between the output port 38 and the drain port 39, and is also movable between the neutral position and a second position (low-speed position), shown in FIG. 2B, where the second land 42 shuts off communication between the input port 37 and the output port 38, while the output port 38 an the drain port 39 communicate with each other via the second oil flow passage 45.

An elastic member 46 is mounted in the spool insertion hole 32 at its closed end portion to bias the spool 40 toward the low-speed position. The elastic member 46 comprises a compression coil spring including axially extending bent pieces 46a and 46b at the respective ends thereof. The bent piece 46a is slidably inserted in an axial hole 47 formed in the distal end surface of the spool 40, while the bent piece 46b engages the end plate 33, which is connected to the valve body 31. The bent pieces 46a and 46b thus prevent rotation of the spool 40 and the threaded shaft 22.

In order, for example, to hydraulically control a cylinder S for changing the speed ratio of a V-belt type continuously variable transmission (CVT) shown in FIG. 1 with the spool valve of the above-described embodiment, the input port 37 is brought into communication with the discharge port of an oil pump P via an oil passage $T_1$, while the output port 38 is brought into communication with an oil feed/discharge port of the cylinder S, which is configured to move a slide pulley member 51 of a driving pulley 50 of the V-belt type CVT toward a fixed pulley member 52 of the driving pulley 50, via an oil passage $T_2$.

This V-belt type CVT is configured to change the speed ratio by changing the diameter of the portion of the V-belt 53 wound around the driving pulley 50 by moving the slide pulley member 51 toward and away from the fixed pulley member 52, and changing the diameter of the portion of the V-belt 53 wound around the driven pulley 54.

FIG. 1 shows the neutral position of the spool 40 of the spool valve, where the spool 40 shuts off communication both between the input port 37 and the output port 38, and between the output port 38 and the drain port 39.

When the electric motor 12 is driven in the state of FIG. 1, the nut 24 rotates, thus axially moving the threaded shaft 22. As a result, the spool 40, connected to the threaded shaft 22, also axially moves.

When the electric motor 12 is rotated in the direction in which the spool 40 is moved toward the high-speed position, the input port 37 communicates with the output port 38 via the first oil flow passage 44 of the spool 40, while the second land 42 of the spool 40 shuts off communication between the output port 38 and the drain port 39, as shown in FIG. 2A. As a result, oil delivered from the oil pump P is fed into the cylinder S, so that the slide pulley member 51 of the driving pulley 50 moves toward the fixed pulley member 52 of the driving pulley 50; that is, the driving pulley 50 is shifted toward the high-speed side.

When the electric motor 12 is rotated in the direction in which the spool 40 is moved toward the low-speed position, as shown in FIG. 2B, the second land 42 of the spool 40 shuts off communication between the input port 37 and the output port 38, while the output port 38 communicates with the drain port 39 via the second oil flow passage 45 of the spool 40. As a result, oil in the cylinder S is discharged into the drain port 39, so that the slide pulley member 51 moves away from the fixed pulley member 52 due to the tension of the V-belt 53; that is, the driving pulley 50 is shifted toward the low-speed side.

Once the V-belt type CVT is shifted to the predetermined speed ratio, the electric motor 12 is reversed to move the spool 40 back to the neutral position. FIG. 1 shows the neutral position of the spool 40, where the second land 42 of the spool 40 shuts off communication between the input port 37 and the output port 38 and between the output port 38 and the drain port 39, so that the speed ratio of the V-belt type CVT remains unchanged.

If the electric motor 12 fails while the spool 40 is at the high-speed position, where the input port 37 communicates with the output port 38, the spool 40 is moved to the low-speed position, shown in FIG. 2B, under the biasing force of the elastic member 46.

When the spool 40 is moved to the low-speed position, the spool 40 shuts off communication between the input port 37 and the output port 38, while allowing communication between the output port 38 and the drain port 39. As a result, oil in the cylinder S is discharged through the output port 38 into the drain port 39, so that the slide pulley member 51 of the driving pulley 50 moves away from the fixed pulley member 52, that is, the driving pulley 50 is shifted toward the low-speed side.

If the electric motor 12 fails with the spool 40 at the high-speed position, since, as described above, the driving pulley 50 is shifted toward the low-speed side, and thus, the vehicle decelerates, impacts on the driver is lower, and the vehicle is safer, than when the driving pulley 50 is shifted toward the high-speed side.

Since the spool valve according to the present invention, shown in FIG. 1, is configured such that the spool 40 is moved axially by driving the electric motor 12 and thus actuating the ball-screw 21, the spool 40 can be moved a longer distance than the spool of a conventional spool valve which is moved by a solenoid. Since the spool 40 is moved a longer distance, it is possible to increase the sectional areas of the input port 37, the output port 38, the drain port 39, and the oil passages $T_1$ and $T_2$, to which the input port 37 and the output port 38 are respectively connected, and thus to more quickly shift the V-belt type CVT.

Figure 3A:
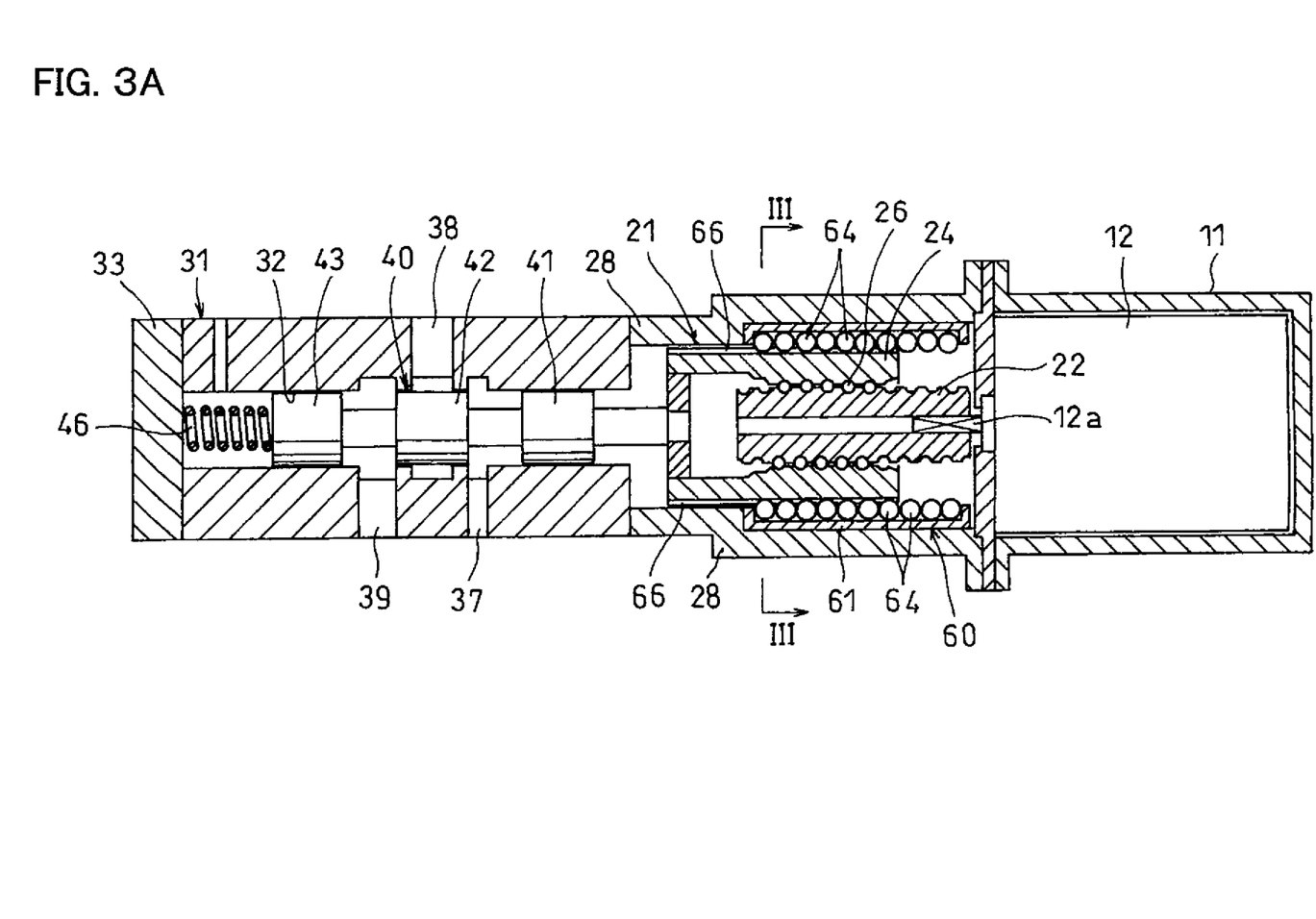
FIG. 3A is a sectional view of another spool valve embodying the present invention.

While the spool valve shown in FIG. 1 is configured to axially move the threaded shaft 22 by rotating the nut 24 of the ball-screw 21, the threaded shaft 22 may be connected, as shown in FIG. 3A, to the rotary shaft 12a of the electric motor 12 such that the nut 24 is moved axially by rotating the threaded shaft 22.

Figure 3B:
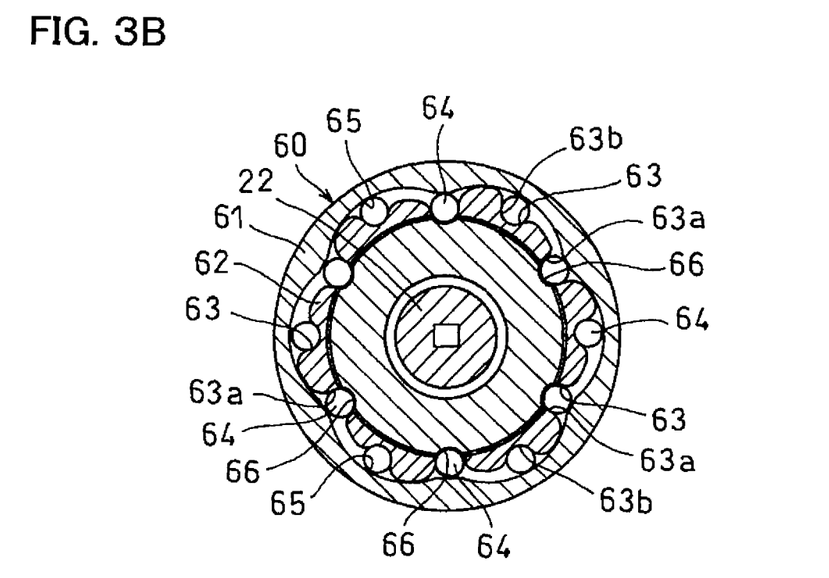
FIG. 3B is a sectional view taken along line III-III of FIG. 3A.
Figure 4A:
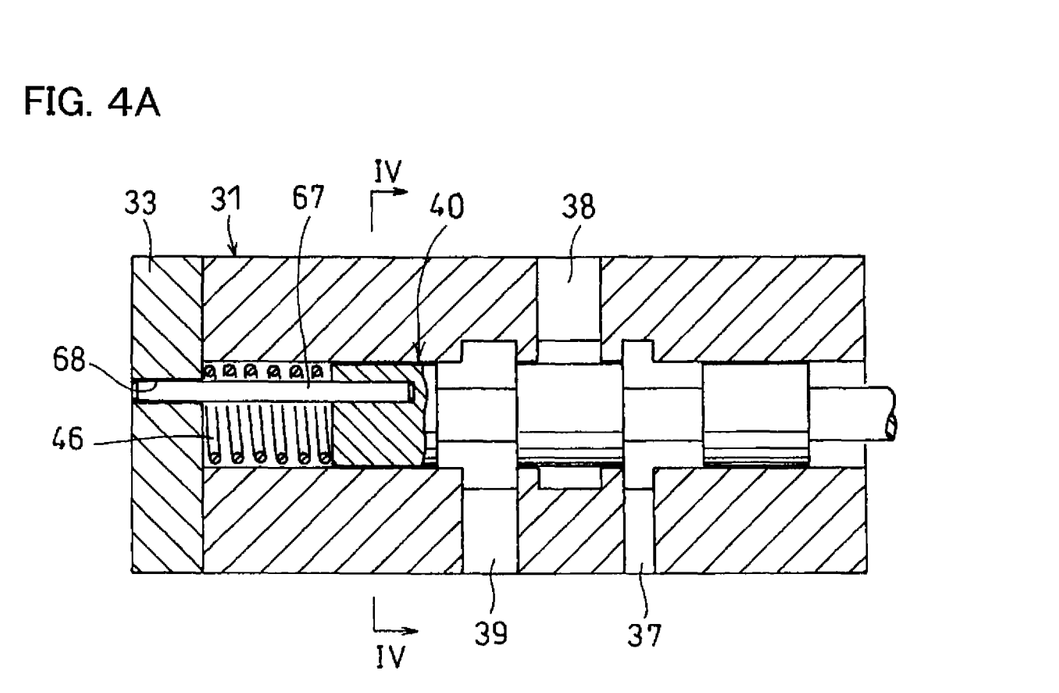
FIG. 4A is a sectional view showing another arrangement for rotationally fixing the spool.
Figure 4B:
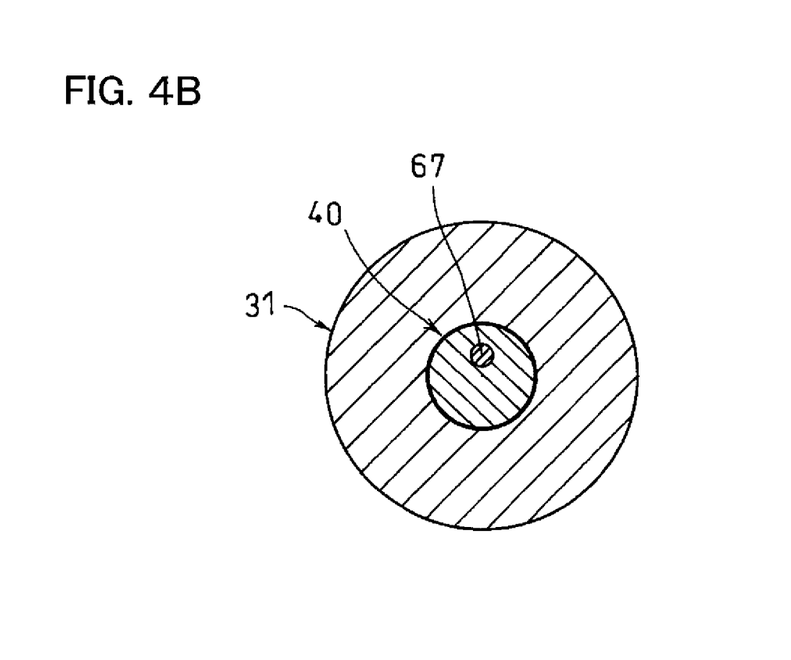
FIG. 4B is a sectional view taken along line IV-IV of FIG. 4A.

In the embodiment of FIGS. 3A and 3B, the nut 24 is supported by a linear ball bearing 60 so as to be not rotatable and axially movable, and the elastic member 46 biasing the spool 40 toward the low-speed position is a compression coil spring having no bent pieces 46a and 46b.

The linear ball bearing 60 rotationally fixing the nut 24 includes an outer race 61 press-fitted in the radially inner surface of the nut case 28, and a retainer 62 mounted in the outer race 61 and formed with a plurality of elongated guide grooves 63 circumferentially spaced apart from, and extending parallel, to each other. The guide grooves 63 comprise a plurality pairs of linear raceway grooves 63a and 63b, of which the linear raceway grooves 63a are elongated holes open at the radially inner surface of the retainer 62. A large number of balls 64 are received in each, guide groove 63 so as to be capable of rolling along a rolling surface 65 formed on the radially inner surface of the outer race 61. The balls 64 received in the linear raceway grooves 63a each partially protrude radially inwardly beyond the radially inner surface of the retainer 62 so as to be capable of rolling along the corresponding one of linear grooves 66 formed in the outer periphery of the nut 24. The retainer 62 thus supports the nut 24 so as to be axially movable but not rotatable.

In the embodiment of FIG. 1, the threaded shaft 22 of the ball-screw 21, which is driven linearly, is rotationally fixed in position by the elastic member 46, while in the embodiment of FIGS. 3A and 3B, the nut 24 of the ball-screw 21, which is driven linearly, is rotationally fixed in position by the linear ball bearing 60. However, a different means may be used to rotationally fix the linearly driven member.

FIGS. 4A and 4B, and 5A and 5B show, respectively, other rotational fixing means for rotationally fixing one of the threaded shaft 22 and the nut 24 that is driven linearly. The rotational fixing means shown in FIGS. 4A and 4B comprises a guide pin 67 extending from the distal end surface of the spool 40 at its off-center position, and a pin hole 68 formed in the end plate 33, which is connected to the valve body 31, such that the guide pin 67 is slidably inserted in the pin hole 68. The rotational fixing means shown in FIGS. 4A and 4B thus rotationally fixes the spool 40, thereby rotationally fixing one of the threaded shaft 22 and the nut 24 that drives the spool 40 in the axial direction.

Figure 5A:
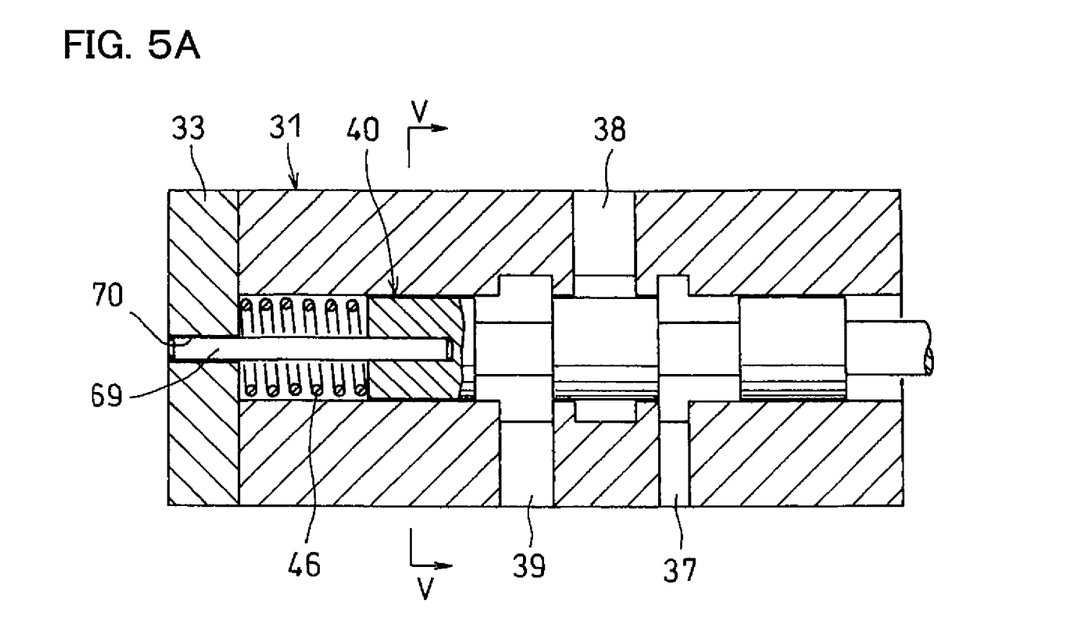
FIG. 5A is a sectional view showing still another arrangement for rotationally fixing the spool.
Figure 5B:
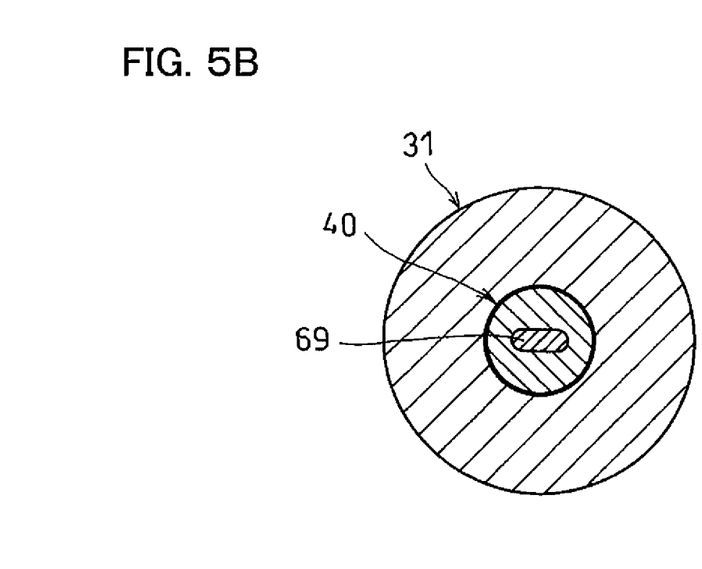
FIG. 5B is a sectional view taken along line V-V of FIG. 5A.

The rotational fixing means shown in FIGS. 5A and 5B comprises a guide pin 69 extending from the distal end surface of the spool 40 at its center, and having a non-circular cross-section, and a pin hole 70 formed in the end plate 33, which is connected to the valve body 31, and having a non-circular cross-section such that the guide pin 69 is slidably inserted in the pin hole 70. The rotational fixing means shown in FIGS. 5A and 5B thus rotationally fixes the spool 40, thereby rotationally fixing one of the threaded shaft 22 and the nut 24 that drives the spool 40 in the axial direction.

Figure 6:
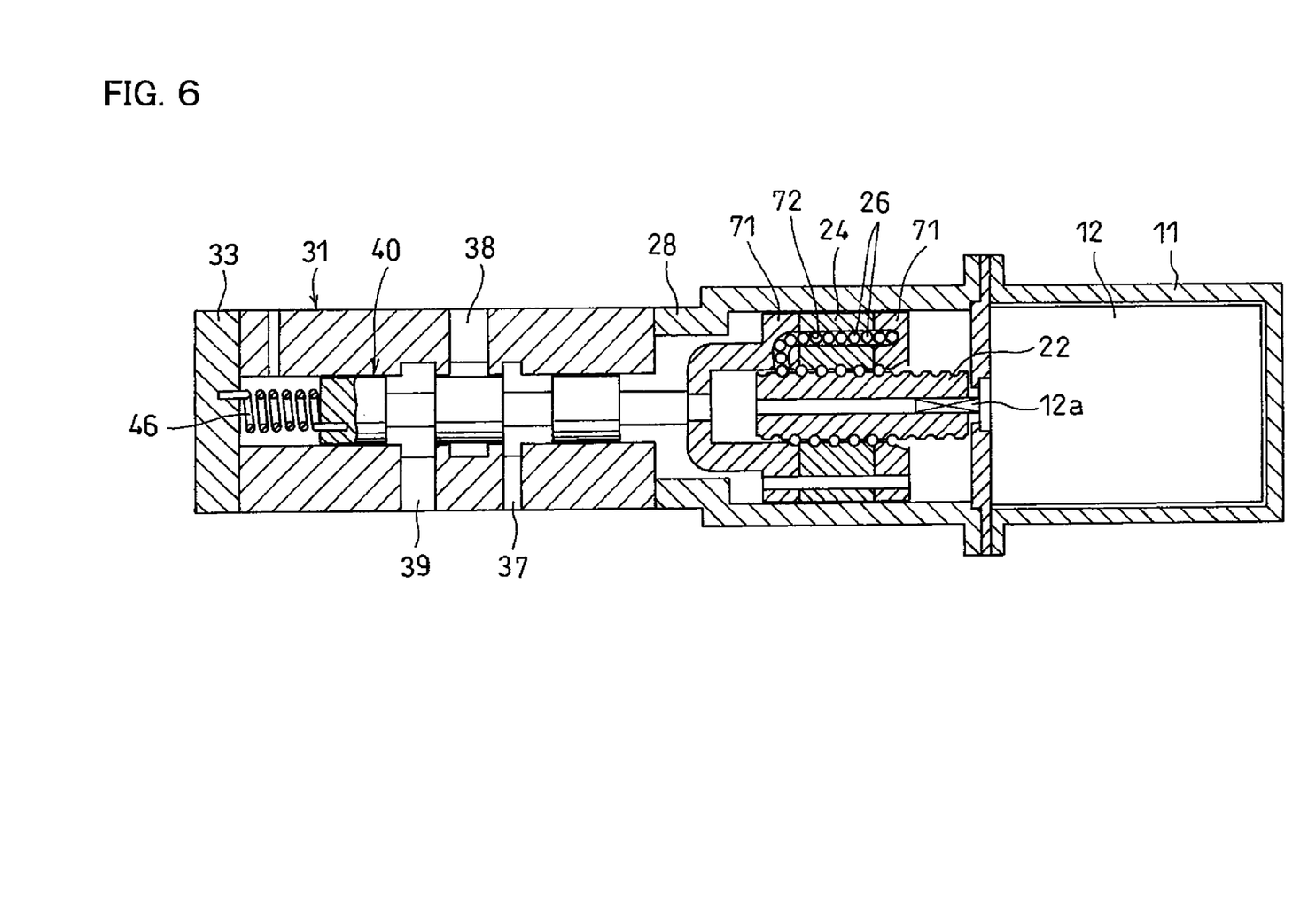
FIG. 6 is a sectional view of still another spool valve embodying the present invention.

While the spool valve shown in FIGS. 3A and 3B uses a track-to-track ball return mechanism to circulate the balls 26 of the ball-screw 21, an end-cap type ball return mechanism shown in FIG. 6 may be used instead, which includes a pair of end caps 71 connected to the respective ends of the nut 24 such that the balls 26 are returned to the starting point through return paths 72 formed in the end caps 71 and the nut 24.

Figure 7A:
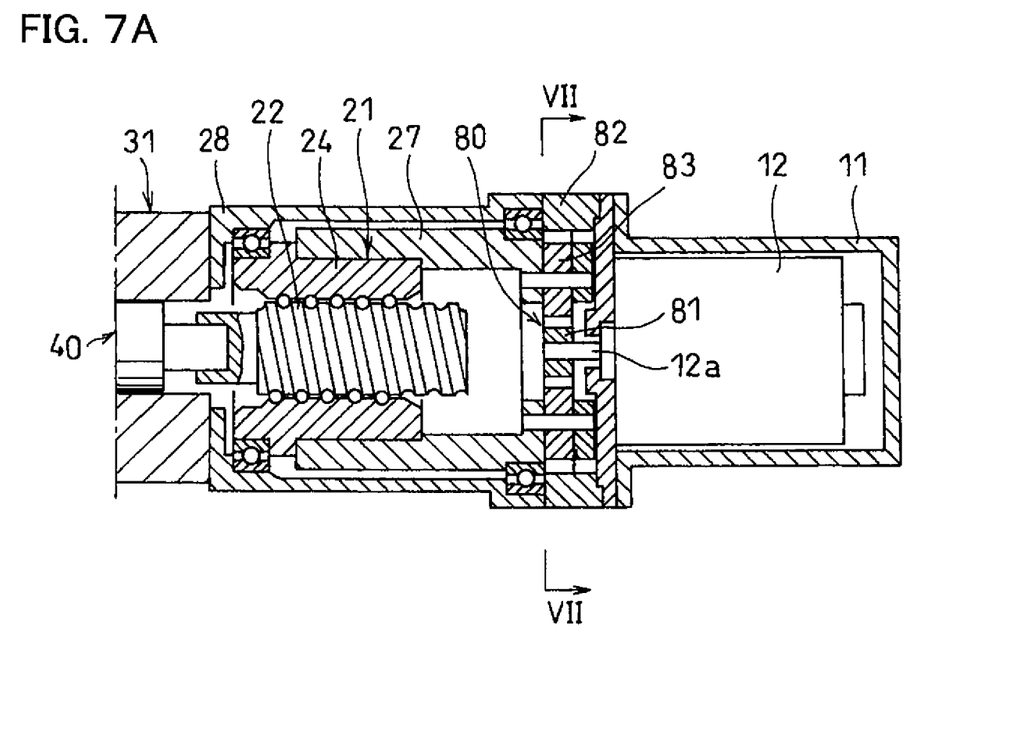
FIG. 7A is a sectional view of yet another spool valve embodying the present invention.
Figure 7B:
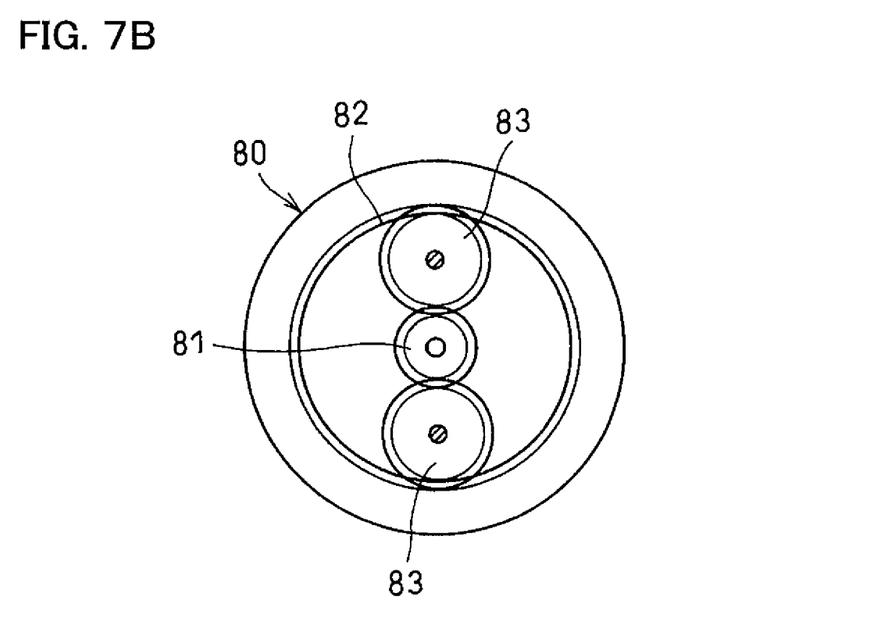
FIG. 7B is a sectional view taken along line VII-VII of FIG. 7A.

FIGS. 7A and 7B shows a different spool valve embodying the present invention. This spool valve differs from the spool valve shown in FIG. 1 in that the rotation of the rotary shaft 12a of the electric motor 12 is transmitted to the nut 24 after being reduced by a planetary gear reduction mechanism 80. Thus, elements corresponding to those of the spool valve of FIG. 1 are denoted by identical numerals, and their description is omitted.

The planetary gear reduction mechanism 80 comprises a sun gear 81 mounted on the rotary shaft 12a of the electric motor 12, a stationary ring gear 82 mounted between the portions of the nut case 28 and the motor case 11 opposed to each other, pinions gears 83 each meshing with both the ring gear 82 and the sun gear 81, and the nut holder 27, which serves as a carrier to support the pinion gears 83. The planetary gear reduction mechanism 80 is configured such that when the sun gear 81 is rotated, the pinion gears 83 are rotated about their respective axes while being revolved around the sun gear 81, whereby the nut holder 27 and the nut 24, which is supported by the nut holder 27, are rotated at a reduced speed.

By reducing the rotation of the rotary shaft 12a of the electric motor 12 with the planetary gear reduction mechanism 80 before being transmitted to the nut 24, it is possible to use a small-capacity motor as the electric motor 12, thus reducing the axial length of the spool valve.

Figure 8:
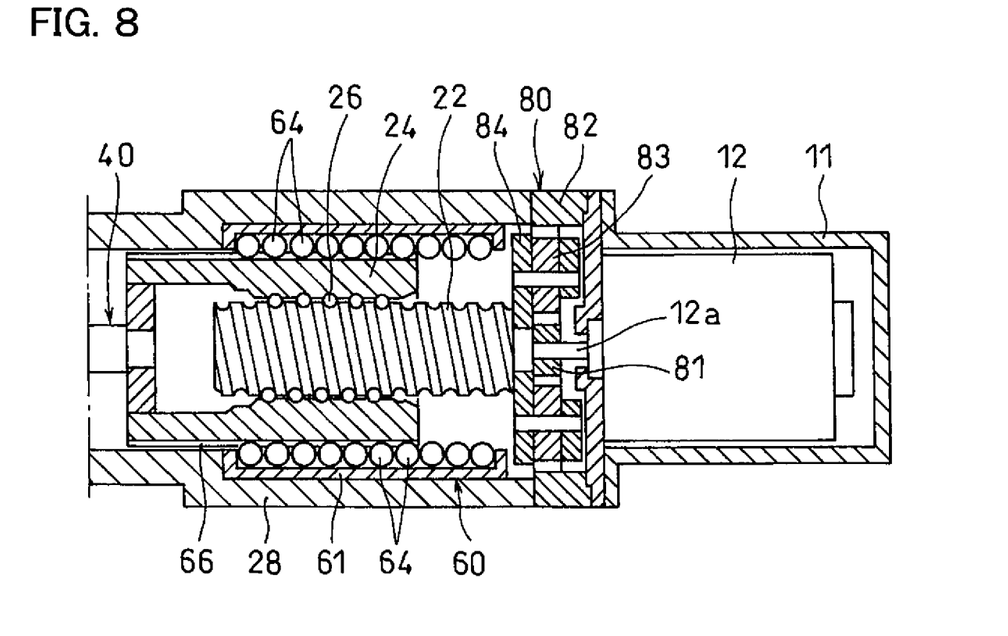
FIG. 8 is a sectional view of still another spool valve embodying the present invention.

FIG. 8 shows another spool valve embodying the present invention which differs from the spool valve shown in FIGS. 3A and 3B in that the rotation of the rotary shaft 12a of the electric motor 12 is transmitted to the threaded shaft 22 after being reduced by a planetary gear reduction mechanism 80 similar to the one shown in FIGS. 7A and 7B.

Figure 9:
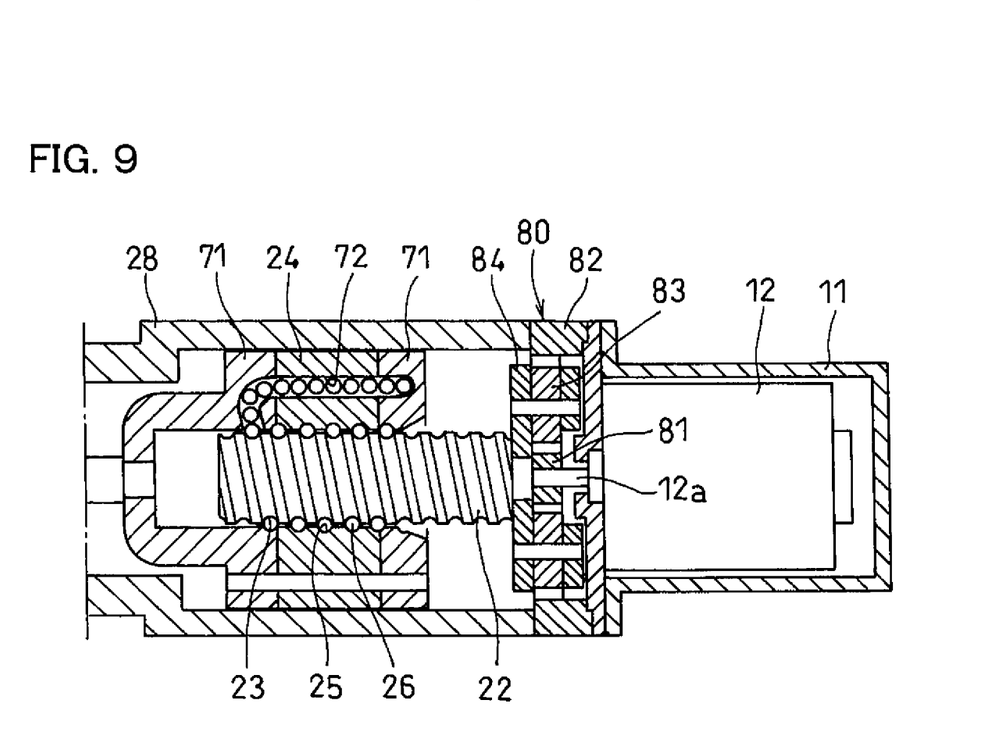
FIG. 9 is a sectional view of still another spool valve embodying the present invention.

FIG. 9 shows still another spool valve embodying the present invention which differs from the spool valve shown in FIG. 6 in that the rotation of the rotary shaft 12a of the electric motor 12 is transmitted to the threaded shaft 22 after being reduced by the planetary gear reduction mechanism 80 shown in FIG. 8. The axial length of either of the spool valves shown in FIGS. 8 and 9 can be made smaller than those of the spool valves shown in FIGS. 3A and 3B, and FIG. 6.

The planetary gear reduction mechanisms 80 shown in FIGS. 8 and 9 each include a carrier 84 rotatably supporting the pinion gears 83 and fixed to the threaded shaft 22 so as to rotate together with the threaded shaft 22.

Figure 10:
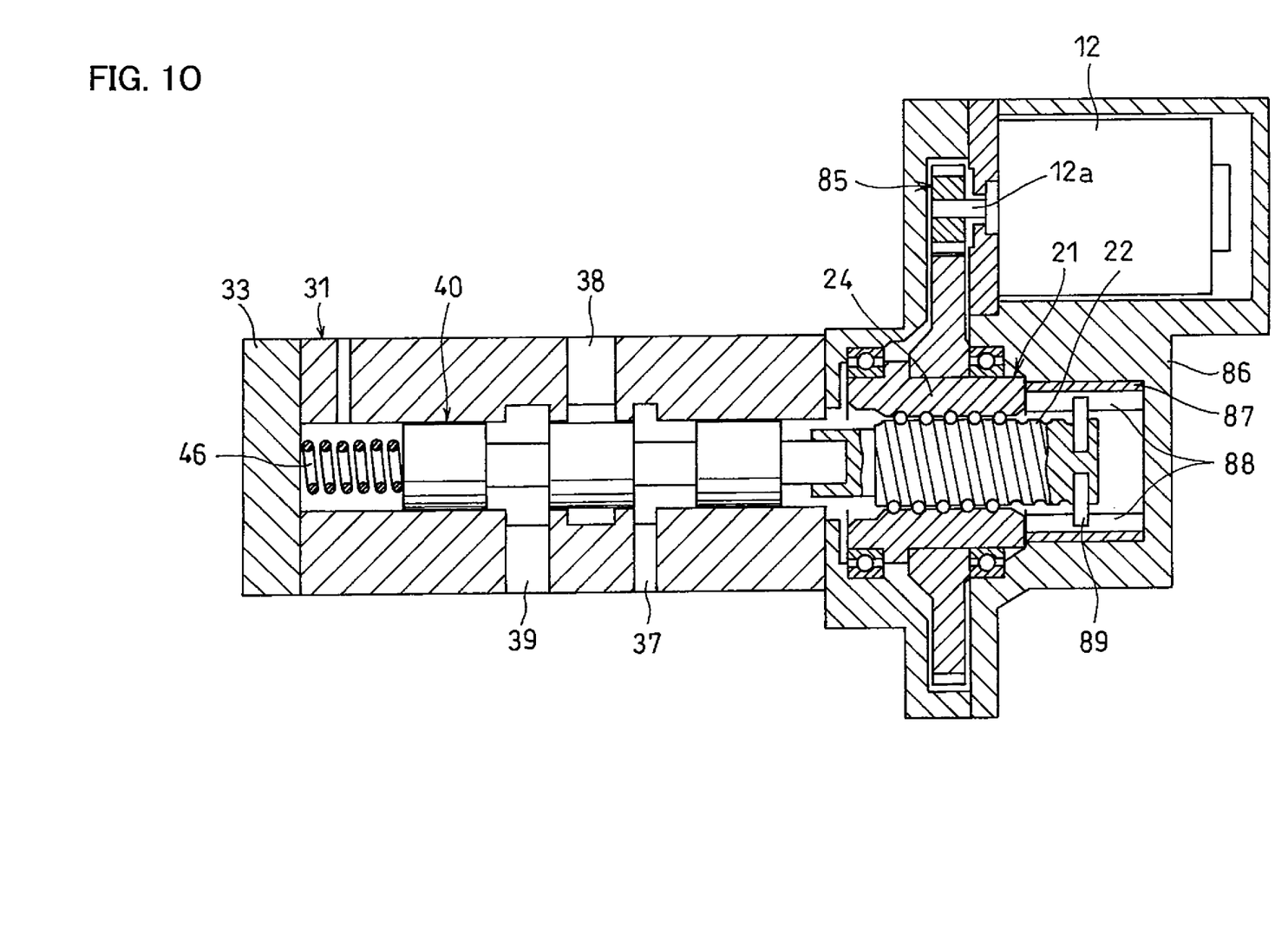
FIG. 10 is a sectional view of still another spool valve embodying the present invention.

FIG. 10 shows still another spool valve embodying the present invention, of which the electric motor 12 is arranged in parallel with the threaded shaft 22 of the ball-screw 21 such that the rotation of the rotary shaft 12a of the electric motor 12 is transmitted to the nut 24 of the ball-screw 21 by way of a spur gear reduction mechanism 85.

The electric motor 12 and the ball-screw 21 are received in a single case 86. A guide tube 87 is mounted in a portion of the case 86 so as to be coaxial with the threaded shaft 22. The guide tube 87 has an inner periphery formed with axial guide grooves 88 in which are slidably inserted guide pins 89 provided on the threaded shaft 22 to rotationally fix the threaded shaft 22. Otherwise, the spool valve shown in FIG. 10 is identical to the spool valve shown in FIG. 1. Thus, elements corresponding to those of the spool valve of FIG. 1 are denoted by identical numerals, and their description is omitted.

As shown in FIG. 10, since the electric motor 12 is arranged in parallel with the ball-screw 21 such that the rotation of the electric motor 12 is transmitted to the nut 24 of the ball-screw 21 after being reduced by the spur gear reduction mechanism 85, it is possible to reduce the axial length of the spool valve.

Figure 11:
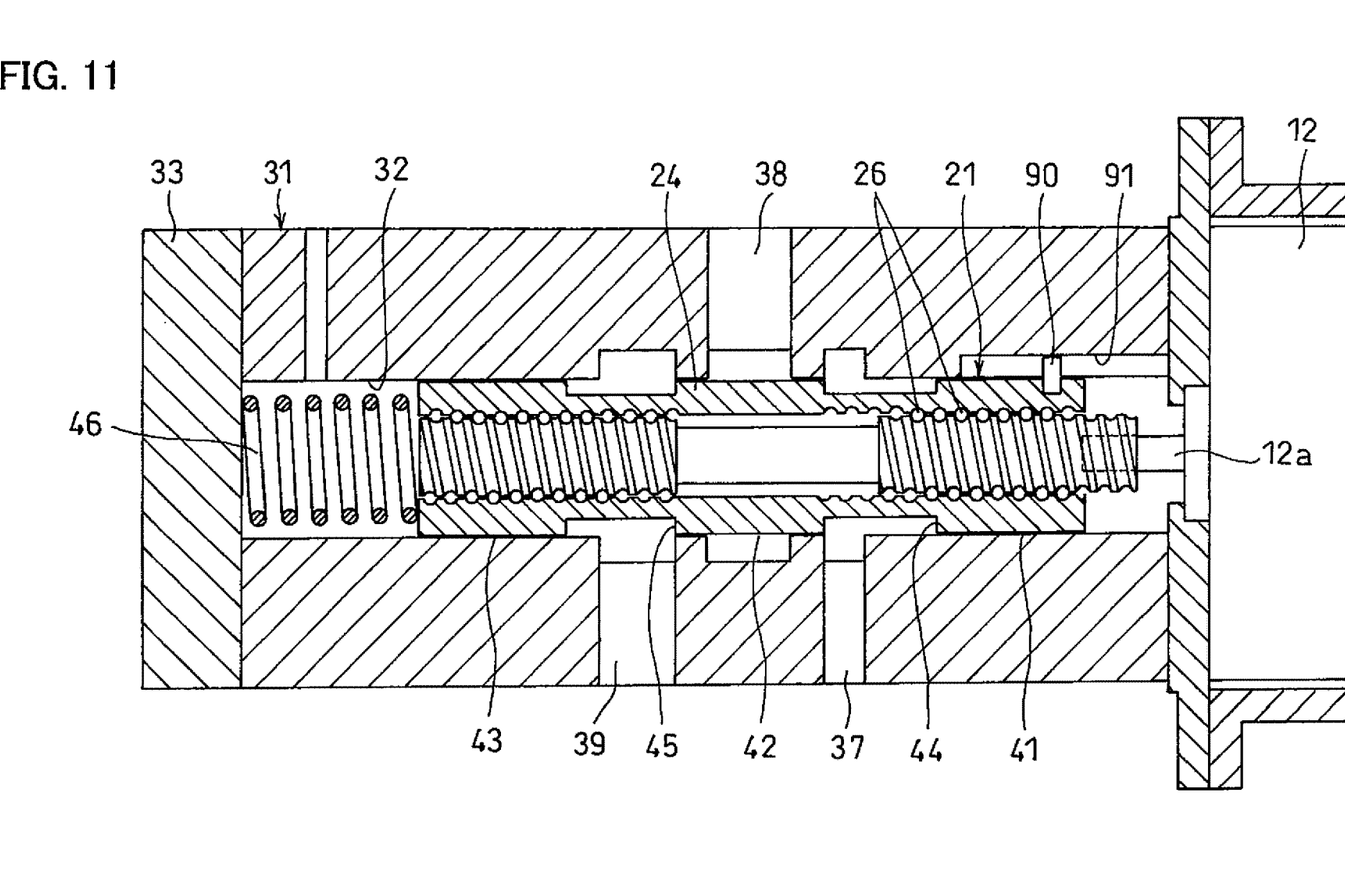
FIG. 11 is a sectional view of still another spool valve embodying the present invention.

FIG. 11 shows still another spool valve embodying the present invention, of which the ball-screw 21, which converts the rotation of the rotary shaft 12a of the electric motor 12 to linear motion, is mounted in the spool insertion hole 32 formed in the valve body 31, with the threaded shaft 22 of the ball-screw 21 connected to the rotary shaft 12a such that the nut 24, which is in threaded engagement with the threaded shaft 22 by way of the balls 26, serves as the spool of the spool valve. Thus, as with the spool 40 shown in FIG. 1, the nut 24 is formed with the first to third lands 41, 42 and 43, and the first and second oil flow passages 44 and 45 between the adjacent lands.

The nut 24, as the spool, is provided with a guide pin 90 on its outer periphery which is slidably inserted in an axial groove 91 formed in the inner periphery of the spool insertion hole 32 so that the nut 24 is slidable but not rotatable.

By using the nut 24 of the ball-screw 21 as the spool as shown in FIG. 11, it is possible to reduce the axial length of the spool valve.

DESCRIPTION OF THE NUMERALS

12. Electric motor
21. Ball-screw
22. Threaded shaft
23. Thread groove
24. Nut
25. Thread groove
26. Ball
31. Valve body
32. Spool insertion hole
33. End plate
37. Input port
38. Output port
39. Drain port
40. Spool
46. Elastic member
46a. Bent piece
47. Axial hole
67. Guide pin
68. Pin hole
69. Guide pin
70. Pin hole
80. Planetary gear reduction mechanism
85. Spur gear reduction mechanism

What is claimed is:

1. A spool valve comprising:
a valve body having a spool insertion hole inside of the valve body, and including an input port, an output port, and a drain port which communicate with the spool insertion hole;
a spool slidably inserted in the spool insertion hole, and configured to selectively allow and prohibit communication between the input port, the output port, and the drain port by moving in an axial direction;
an electric motor configured to drive the spool in the axial direction;
a ball-screw configured to convert a rotary motion of the electric motor to a linear motion of the spool in the axial direction such that when the electric motor is rotated in a first direction, the spool is moved to a first position where the spool allows communication between the input port and the output port, while shutting off communication between the output port and the drain port, and when the electric motor is rotated in a second direction, the spool is moved to a second position where the spool shuts off communication between the input port and the output port, while allowing communication between the output port and the drain port; and
an elastic member biasing the spool toward the second position;
wherein the ball-screw comprises:
a threaded shaft having a thread groove on an outer periphery of the threaded shaft;
a nut fitted on the threaded shaft, and having a thread groove on an inner periphery of the nut; and
balls disposed between the thread groove of the nut and the thread groove of the threaded shaft,
wherein the nut is a rotary member configured to be rotated by the electric motor without being moved in the axial direction, and the threaded shaft is a linear motion member configured to be moved in the axial direction, and move the spool in the axial direction, when the electric motor is rotated; and
a nut holder disposed between the nut and the electric motor so as to be rotatable together with the nut, the nut holder being connected to a rotary shaft of the electric motor so as to be rotationally driven by the electric motor.

2. The spool valve of claim 1, further comprising a planetary gear reduction mechanism configured such that rotation of the electric motor is transmitted to the nut of the ball-screw after being reduced by the planetary gear reduction mechanism.

3. The spool valve of claim 1, wherein the electric motor is arranged in parallel with the ball-screw, and the spool valve further comprises a spur gear reduction mechanism configured such that rotation of the electric motor is transmitted to the nut of the ball-screw after being reduced by the spur gear reduction mechanism.

4. The spool valve of claim 1, wherein:
the elastic member comprises a compression coil spring having a first bent piece at a first end of the compression coil spring, and a second bent piece at a second end of the compression coil spring;

the first bent piece extends in the axial direction and is slidably inserted in an axial hole defined in an end surface of the spool; and the second bent piece is in engagement with the valve body such that the spool and the threaded shaft of the ball-screw are rotationally fixed in position by the elastic member.

5. The spool valve of claim 1, further comprising a guide pin extending from a distal end surface of the spool at an off-center position of the spool, wherein the guide pin is slidably inserted in a pin hole defined in an end plate of the valve body such that the spool and the threaded shaft of the ball-screw configured to move the spool in the axial direction are rotationally fixed in position by the guide pin.

6. The spool valve of claim 1, further comprising a guide pin extending from a center of a distal end surface of the spool and having a noncircular cross section, wherein the guide pin is slidably inserted in a pin hole defined in an end plate of the valve body, the pin hole having a noncircular cross section such that the spool and the threaded shaft of the ball-screw configured to move the spool in the axial direction are rotationally fixed in position by the guide pin.

* * * * *